United States Patent [19]

van der Werff

[11] 4,389,839

[45] Jun. 28, 1983

[54] REINFORCING CORD FOR ELASTOMERIC ARTICLES, SHAPED ARTICLES OF REINFORCED ELASTOMERIC MATERIAL, MORE PARTICULARLY PNEUMATIC TIRES FOR VEHICLES, AND A PROCESS FOR THE MANUFACTURE OF REINFORCING CORD AND A PROCESS FOR THE MANUFACTURE OF VEHICLE TIRES

[75] Inventor: Oebele P. van der Werff, Doetinchem, Netherlands

[73] Assignee: Akzo nv, Netherlands

[21] Appl. No.: 223,150

[22] Filed: Jan. 7, 1981

[30] Foreign Application Priority Data

Jan. 16, 1980 [NL] Netherlands .......................... 8000265

[51] Int. Cl.³ .......................... D02G 3/38; D02G 3/40; D02G 3/48
[52] U.S. Cl. ........................................ 57/238; 57/236; 57/237; 57/241; 57/242; 57/902; 57/292; 152/359

[58] Field of Search ................. 57/902, 229, 231, 232, 57/234, 236, 237, 238, 240, 241, 242, 243, 244, 249, 250, 251, 200, 3, 6, 7, 12, 14, 282, 292, 295, 297

[56] References Cited

U.S. PATENT DOCUMENTS

| | | | |
|---|---|---|---|
| 3,419,059 | 12/1968 | Bridge | 57/902 X |
| 3,429,354 | 2/1969 | Brooks | 57/902 X |
| 3,938,313 | 2/1976 | Marzocchi | 57/902 X |
| 3,977,172 | 8/1976 | Kerawalla | 57/902 X |
| 4,155,394 | 5/1979 | Shepherd et al. | 57/902 X |

*Primary Examiner*—Donald Watkins
*Attorney, Agent, or Firm*—Stevens, Davis, Miller & Mosher

[57] ABSTRACT

The invention particularly relates to a reinforcing cord for elastomeric objects, which cord is built up of two or more groups of endless filament bundles which are twisted or laid together. Each group contains at least one bundle of PPDT filaments and at least one bundle of rayon filaments. The cord is especially meant for use in pneumatic tires of vehicles. When use is made of the cord composite according to the invention, radial ply tires for trucks need be provided with only two carcass plies and heavy-duty tires of passenger cars need comprise only one carcass ply.

25 Claims, 9 Drawing Figures fig.1 fig.2 fig.3 fig.4 fig.5 fig.6 fig.7 fig.8 fig.9

REINFORCING CORD FOR ELASTOMERIC ARTICLES, SHAPED ARTICLES OF REINFORCED ELASTOMERIC MATERIAL, MORE PARTICULARLY PNEUMATIC TIRES FOR VEHICLES, AND A PROCESS FOR THE MANUFACTURE OF REINFORCING CORD AND A PROCESS FOR THE MANUFACTURE OF VEHICLE TIRES

Reinforcing cord for elastomeric articles, shaped articles of reinforced elastomeric material, more particularly pneumatic tires for vehicles, and a process for the manufacture of reinforcing cord and a process for the manufacture of vehicle tires.

The invention relates to a reinforcing cord for elastomeric articles, which cord is built up from two or more, for instance three, four or five endless filament bundles which are twisted or laid together and substantially consist of two different materials.

Reinforcing cords composed of one kind of material are used on a large scale, particularly for reinforcing pneumatic tires for vehicles. In view of the increasingly high demands made on automobile tires, various materials have already been proposed for the reinforcing cords in the reinforcing fabric. Materials that are still often used at present for making reinforcing cords for automobile tires are yarns of nylon, polyester and rayon and also steel cord. Another material for reinforcing cord, which has been gaining very much ground in the last few years, consists of poly-paraphenylene terephthalamide. Like steel cord, yarns and cords of poly-paraphenylene terephthalamide, hereinafter referred to as PPDT, have a modulus and a tenacity which are considerably higher than in the case of yarns of nylon, polyester or rayon. The elongation at rupture of PPDT yarns is considerably lower than that of nylon yarns, polyester yarns or rayon yarns. Because of the above-indicated differences in properties of the various individual cord materials such as nylon, polyester, rayon and PPDT there has already been the idea to form yarns of different materials into a reinforcing cord composite that is considered to have optimum properties for a particular field of application.

Some kind of cord composite is described in British Patent Publication 2,003,525. It proposes a cord composed of PPDT yarns and polyester or nylon yarns in which the PPDT yarns in the cord have a higher residual twist than the polyester or nylon yarns. By this higher residual twist in the PPDT yarns it was attempted to somewhat reduce the great difference in modulus between the PPDT yarns and the polyester or nylon yarns. However, the higher residual twist in the PPDT yarns also causes a reduction of the high tenacity typical of PPDT yarns. Further, said difference in residual twist leads to an asymmetrical cord whose usefulness is generally inferior to that of a symmetrical cord.

A further example of a cord composite for reinforcing pneumatic tyres for vehicles is described in Netherlands Patent Specification 6 903 966. It proposes, int.al., cords of polyamide fibres and polyester fibres or rayon fibres as well as cords of polyamide fibres and glass fibres. It also proposes the manufacture of cord from filament yarns of different materials having different moduli of elasticity. Moreover, it proposes that the cord yarns having a high modulus of elasticity should be given a high initial twist and the cord yarns having a low modulus be given a lower, possibly opposite, initial twist. Therefore, also in the case of the cords according to this Netherlands Patent Specification the advantage of the higher modulus and the attendant high tenacity will partly be lost as a result of the higher initial twist in the yarn having a higher initial modulus. Further, a difference in initial twist between the constituent yarns of the cord composite will lead to an asymmetrical cord.

The invention has for its object to provide a reinforcing cord of the type mentioned in the opening paragraph which no longer displays the above-indicated disadvantages. The reinforcing cord according to the invention is built up from two or more endless filament bundles which are twisted or laid together and substantially consist of two different materials, and the cord according to the invention is characterized in that at least one filament bundle is of poly-paraphenylene terephthalamide and at least one filament bundle is of viscose rayon. The preferred embodiment according to the invention is characterized in that the cord is built up of two or more groups which each contain two or more filament bundles and that in each group at least one filament bundle is of poly-paraphenylene terephthalamide and at least one filament bundle is of viscose rayon. A very useful product is obtained if in the cord according to the invention the bundles of filaments of PPDT have the following properties:

- an inherent viscosity of at least 2.5, and preferably at least 3.5 and less than 7;
- a tenacity of at least 10 cN/dtex, and preferably at least 17 cN/dtex, and less than 40 cN/dtex;
- an elongation at rupture of at least 2.7%, by preference at least 3.4%, and less than 6%;
- a specific 1%-LASE value of at least 2.8 Cn/dtex, and preferably at least 3.5 cN/dtex, and less than 15 cN/dtex.

A very useful product is obtained if, moreover, in the cord according to the invention the filament bundles of viscose rayon have the following properties:

- a tenacity of at least 3 cN/dtex, and preferably about 5 cN/dtex, and less than 12 cN/dtex;
- a Tappi viscosity of about 6 centi Poise;
- an elongation at rupture of at least 8%, and preferably about 13%, and less than 25%;
- a specific 5%-LASE value of at least 1.5 cN/dtex, and preferably about 2.3 cN/dtex, and less than 20 cN/dtex.

Of the above-mentioned properties of the filament bundles of PPDT and rayon the tenacity, the elongation at rupture and the specific LASE values were determined on undipped yarns, i.e. yarns that had not yet been aftertreated with a binder and/or an adhesive. The determination of these properties will be further described hereinafter. It should meanwhile be noted that "LASE" stands for "Load at Specified Elongation".

Particularly favourable results have been obtained with a reinforcing cord which is characterized according to the invention in that in each group the separate filament bundles of different materials have practically no twist.

The reinforcing cord according to the invention is advantageously characterized in that the ratio $$\frac{R}{D} = \frac{D_{rayon}}{D_{PPDT}}$$

is in the range of 0.2 to 4.0, and preferably $$\frac{R}{D} = 1 \text{ to } 1,5,$$

where $$D_{PPDT} = \sqrt{\frac{4 \cdot Ap}{\pi}},$$

wherein Ap is the average cross-sectional area of the PPDT filaments, and where $$D_{rayon} = \sqrt{\frac{4 \cdot Ar}{\pi}},$$

wherein Ar is the average cross-sectional area of the rayon filaments. Further, the reinforcing cord according to the invention is characterized in that in each group the ratio $$\frac{R}{T} = \frac{T_{rayon}}{T_{PPDT}}$$

is in the range of 10 to 0.1, but by preference R is approximately equal to a value in the range of 1 to 2, where $T_{PPDT}$ is the linear density in decitex of the filament bundle(s) of PPDT, and $T_{rayon}$ is the linear density in decitex of the filament bundle(s) of viscose rayon. Favourable results have been obtained with a reinforcing cord which is characterized according to the invention in that each of said groups is formed by one filament bundle of PPDT and one filament bundle of viscose rayon, and in that of the PPDT filament bundle the total linear density is in the range of 350 to 3500 decitex, and preferably in the range of about 850 to 1700 decitex, and the number of filaments of this PPDT bundle is in the range of 200 to 2400, and preferably in the range of about 500 to 1000, and in that of the rayon filament bundle the total linear density is in the range of 1000 to 3000 decitex, and the number of filaments of said rayon bundle is in the range of about 500 to 2000.

The reinforcing cord according to the invention is advantageously characterized in that the cord is built up from groups of filament bundles, of which each group has an initial twist of 100 to 400 turns per meter, and preferably about 200 to 300 turns per meter, and in that two or more of said groups of filament bundles are twisted together in opposite direction to a cord twist of 100 to 400 turns per meter, and preferably 200 to 300 turns per meter.

Of the reinforcing cord according to the invention the twist factor $$T = n\sqrt{\frac{t}{d}}$$

should be in the range of 10000 to 25000, but preferably it should be in the order of 18000.

A cord which may be applied particularly effectively in automobile tires is characterized according to the invention in that it is provided with a binder, an adhesive and/or a rubber protecting agent. This last-mentioned agent may be formed from resins based on resorcinol-formaldehyde latex and/or polyurethane latex.

Despite the great difference in modulus and LASE value between the PPDT and the rayon from which the cord composite according to the invention is built up, it has been found surprisingly that without imparting a higher twist to the PPDT having the highest modulus and LASE value it is possible yet to obtain a satisfactory cord composite whose behaviour is practically identical with that of a homogeneous cord of one kind of material. Particularly, the stress-strain curve of the cord composite according to the invention has a shape similar to that of homogeneous cords and does not show any discontinuities. Since 100%-rayon and 100%-PPDT cords have opposite stress-strain curves, viz. concave and convex, respectively, the cord composite according to the invention permits realizing different intermediate forms. For instance, a 3-ply cord composite containing 30% PPDT has a practically straight stress-strain "curve", whereas a 2-ply cord displays a somewhat convex stress-strain curve. Upon subjecting the cord composite according to the invention to a tensile test there will be a single break. For a cord composite according to the invention, which is made up of groups of filament bundles and each group is built up from one non-twisted filament bundle of PPDT and one non-twisted filament bundle of rayon, this is particularly surprising in that the filaments of the bundles in each group run parallel to each other. The manufacture of a cord composite according to the invention from non-twisted filament yarn bundles is economically attractive in that it permits a saving on the cost of twisting.

The invention also comprises shaped articles of elastomeric material, more particularly pneumatic tires for vehicles, which are reinforced with the cord composites according to the invention. More particularly, the cord composite according to the invention is considered suitable for use in the carcass of radial ply tires for truck and passenger cars. Instead of in the carcass the cord composite according to the invention may be advantageously used in the belts of automobile tires. Further, the cord composite according to the invention may be employed for reinforcing articles such as V-belts, conveyor belts, hose and like objects made of elastomeric material. Favourable results have been obtained with a cord composite according to the invention of the following construction: (decitex 1840/f1000, rayon, +decitex 840/f500, PPDT) Z225×3S 225 having a twist factor T=18000. This last-mentioned cord consists of 3 groups, each group consisting of one non-twisted filament bundle of rayon and one non-twisted filament bundle of PPDT. Each group has a Z-twist of 225 t/m and the three groups are twisted together to a cord twist of 225 t/m in S-direction. After this cord has been dipped, i.e. provided with a binder, an adhesive and/or protecting agent for rubber in the manner usual for homogeneous tire cord, and subsequently been aftertreated under tension at elevated temperature, it has a strength, measured in the bonedry state, of about 585 N, which amounts to a tenacity of 650 mN/tex (non-corrected for absorbed dip) or approximately 780 N/mm². Further, this cord has a diameter of 0.98 mm. Also favourable results have been obtained with a cord composite according to the invention of the following construction:

(dtex×2440/f 1000 rayon+dtex 1680/f 1000 PPDT)Z 270×2 S225 having a twist factor T=18000. This last-mentioned cord is made up of 2 groups, each group comprising one untwisted bundle of rayon filaments and one untwisted bundle of PPDT filaments. Each group has a Z-twist of 225 t/m and the two groups are twisted together to form a cord having a cord twist in S-direction of 225 t/m. Following dipping this cord has a strength in the bonedry state of about 690 N, which approximately amounts to a tenacity of 720 mN/tex (non-corrected for dip absorption) or about 820 N/mm², the cord having a diameter of 1.03 mm. On the basis of these strengths, construction and dimensions these types of cord composite according to the invention can be used in principle to build a substantial portion of the carcass of a truck tire, applying 2 carcass plies and a normal covering factor, i.e. a number of reinforcing cords usually employed for building carcasses of truck tires. When use is made of a conventional reinforcing fabric of homogeneous rayon tire cord, sufficient strength can often be obtained only if the carcass of a truck tire is built up of four or more plies, which has several disadvantages, such as the relatively high weight of the tire, with all its consequences, including higher rubber consumption, leading to higher costs both for the tire manufacture and the users of tires. Because of the high tenacity of PPDT application of a reinforcing fabric of homogeneous PPDT tire cord would call for the use of only one carcass ply for truck tires.

In single-ply carcasses, however, faults which are almost inevitable in the original carcass fabric formed from the reinforcing cords will have a considerable unfavourable effect. Further, the use of a single-ply carcass has the disadvantage that at the point of the overlap there will be an additional thickening.

The last-mentioned cord composite according to the invention of PPDT and viscose rayon has the advantage that it permits building a substantial portion of a truck tire, applying 2 carcass plies. Over a tire having a 1-ply-carcass the use of a 2-ply carcass has the advantage that the faults in the one ply are generally compensated for by the other ply. Furthermore, over a carcass ply of homogeneous PPDT cord the use of a two-ply carcass of the cord composite according to the invention has the unexpected advantage that the adhesion to the rubber in the tire is practically just as favourable as in homogeneous rayon cord. Over the use of more than 2 carcass plies of homogeneous rayon cord the use of the cord composite according to the invention with the carcass being made up of only 2 plies has the advantage of obtaining a lighter tire and less rubber being needed. In the manufacture of tires for passenger cars problems such as load conditions and constructions distinctly differ from those met in the case of truck. In the case where use is made of fully rayon reinforcing cord for tires of passenger cars the tires are generally provided with two carcass plies in order to obtain sufficient strength. Alternatively, in the manufacture of relatively light tires for passenger cars use may be made of one carcass ply made up of 100%-polyester reinforcing cords. Surprisingly, the cord composite according to the invention is expected to permit using only a single carcass ply even in heavy-duty tires for passenger cars, which leads to economy on labour, amount of rubber, weight of the tire and on energy consumption during use. Compared with polyester cords, the cord composite according to the invention has more favourable shrinkage, growth and creep properties.

For the manufacture of the cord composite according to the invention the viscose rayon filaments to be processed have a density of about 1.52 grams/cm³ and the PPDT filaments have a density of 1.44 grams/cm³. If the cord composite is built up from rayon filament bundles each of decitex 1840/f 1000 or decitex 2440/f 1000 and PPDT filament bundles each of decitex 1680/f 1000 or decitex 840/f 500, then in the cord composite according to the invention both the linear densities and the average diameters of the separate filaments of rayon and PPDT will show relatively little difference. The linear densities and the diameters of the filaments of the different materials differing only slightly probably has a favourable influence on the cord composite according to the invention. Perhaps these last-mentioned linear density and diameter values of the rayon and the PPDT filaments are the cause of the composite cord according to the invention surprisingly behaving as a homogeneous cord, which has a beneficial effect on the properties, the manufacture, the processing and the use of the cord composite according to the invention. It should be noted that in the case of known cord composites of other combinations of materials, such as aramid/nylon, aramid/polyester and aramid/steel the filaments of the different materials often have far greater differences in linear density and diameter.

The invention also comprises a process for the manufacture of the afore-described reinforcing cord for elastomeric objects, which process is characterized in that two or more groups of filament bundles are formed, each group comprising two or more filament bundles and in each group at least one filament bundle is formed from poly-paraphenylene terephthalamide and at least one filament bundle is formed from viscose rayon, and in that in the formation of the groups the filament bundles of poly-paraphenylene terephthalamide and rayon have a twist of not more than 50 t/m, and preferably have hardly any twist, and in that each group of filaments is given a group initial twist in one direction and two or more groups of filament bundles provided with an initial twist are twisted together to form a cord having a cord twist in the opposite direction. According to the invention the group initial twist and the cord twist imparted are of virtually the same magnitude, so that a symmetrical cord is formed. A simple and effective process for applying a binder and/or an adhesive to the reinforcing cord is characterized according to the invention in that the cord is passed through a bath containing an emulsion based on resorcinol-formaldehyde latex and/or polyurethane latex and the cord is aftertreated under tension at elevated temperature. According to the invention the cord composite need be passed only once through the bath containing the adhesion promoting liquid and the aftertreatment is carried out over a period of 50 to 300 seconds, preferably 120 seconds, at a temperature in the range of 120° to 220° C., preferably 150°–175° C., and at a tension of at least 5 mN/tex and not higher than 100 mN/tex, and preferably 10 to 20 mN/tex.

The invention is also directed to a process for the manufacture of a pneumatic tire for a vehicle, in which tire as reinforcing material the cord according to the invention is used. Particularly, the invention comprises a process for the manufacture of a radial ply tire for a motor-lorry, which tire is characterized according to the invention in that it is provided with a two-poly carcass containing the reinforcing cords according to the invention.

It should be added that poly-paraphenylene terephthalamide is preferably prepared from p-phenylene diamine and terephthaloyl dichloride in a medium of N-methyl pyrrolidone and at least 5% calcium chloride, as described in the Netherlands Patent Application 7 502 060. A bundle of filaments of PPDT can be obtained from a spinning solution having a temperature of 20°–120° C. and consisting of a mixture of concentrated sulphuric acid containing, say, 97.5 percent by weight and, calculated on the weight of the mixture, at least 15% of the PPDT having an inherent viscosity of at least 2.5, the spinning solution being extruded in a downward direction into a coagulating bath by forcing said solution through a spinnerette whose outflow side is in a gaseous inert medium and at a short distance, which may range from, say, 3 to 20 mm, from the liquid surface of the coagulating bath, as is described in U.S. Pat. No. 3,414,654. After the filament bundle has left the coagulating bath, it is subjected to a few aftertreatments, such as washing and drying, after which the completed PPDT filament bundle is wound into the form of a package.

The viscose rayon filament bundles used in the cord composites according to the invention are preferably of a material which is commercially available under the trade name Cordenka. The viscose rayon filament bundles to be used in the cord composite according to the invention can be manufactured in the manner commonly employed in the art of producing tire yarn.

First of all the invention is further illustrated by the figures mentioned in Table I. In it the cord composite I is of the following construction:

(dtex 1840/f 1000 rayon+dtex 1680/f 1000 PPDT) Z 270×3 S270.

The cord composite II has the construction:

(dtex 1840/f 1000 rayon+dtex 840/f 5000 PPDT)Z 310×3 S310.

For comparison, Table I also mentions figures for a homogeneous rayon tire cord of the construction:

(dtex 2440/f 1000 rayon)Z 335×3 S335

TABLE I

|  | Cord composite I | | Cord composite II | | Homogenous rayon cord dipped[1] |
|---|---|---|---|---|---|
|  | greige undipped | dipped[1] | greige undipped | dipped[1] |  |
| AD linear density dtex (air dry) | 12820 | 13340 | 9720 | 10080 |  |
| BD linear density × 1,125 dtex[2] |  | 13700 |  | 10330 | 8950 |
| Diameter mm | 1,28 | 1,27 | 1,13 | 1,09 | 0,95 |
| Twist factor |  | 25000 |  | 25000 | 25000 |
| BD strength N | 693 | 695 | 450 | 452 | 315 |
| BD tenacity mN/tex |  | 507[5] |  | 463[5] | 352[5] |
| BD tenacity N mm² |  | 549 |  | 496 | 445 |
| BD elong. at rupture % | 10,7[3] | 10,0[4] | 10,0[3] | 9,5[4] | 13,2 |
| BD 3%-LASE value N | 132 | 164 | 103 | 136 | 119 |
| BD 5%-LASE value N | 232 | 279 | 183 | 223 | 169 |
| Wt proportion PPDT % |  | 48 |  | 31 | 0 |
| Volume proportion PPDT % |  | 49 |  | 32 | 0 |

[1]Dipping, i.e. applying a liquid adhesive to the cord, was carried out in the manner usual for rayon tires cord and with the same composition of the dip. The cord was aftertreated at a tension of 6,5 mN/tex.
[2]For rayon it is usual to multiply the linear density in the bonedry state (BD) by 1,125.
[3]Pre-tension 12,5 mN/tex.
[4]Pre-tension 20 mN/tex.
[5]Not corrected for dip absorption Table I demonstrates that upon dipping the cords their strength is increased or at least maintained, whereas dipped homogeneous rayon cord generally show a loss of strength of 5–10%, dipped homogeneous PPDT cords retain practically the same strength or display an increase in strength of a few percent. The twist factor T=25000 is the value commonly used for homogeneous rayon cords. The stress-strain curves for these cord composites display no discontinuities and the breaks were simultaneous. So in this respect the behaviour of the cord composites was identical with that of a homogeneous cord. This is surprising in that even a two-ply homogeneous PPDT cord often breaks in stages.

Further, for the tenacities the efficiency of the cord composite was calculated. By this efficiency is to be understood the ratio of the measured tenacity to the sum of the tenacity values of the rayon portion and the PPDT portion:

$$\text{Efficiency of cord composite I:} \frac{507}{\frac{1}{2} \times 352 + \frac{1}{2} \times 950} = 78\%$$

$$\text{Efficiency of cord composite II:} \frac{463}{\frac{2}{3} \times 352 + \frac{1}{3} \times 950} = 84\%$$

It should be added that the value: 950 mN/tex is the tenacity of a homogeneous PPDT cord dipped at 25 mN/tex. It is the value extrapolated for a twist factor of 25000. T=25000 is a value which is abnormally high for homogeneous PPDT cord. The normal twist factor for PPDT cord is 16500. The surface of the cord composites I and II shows alternately white stripes of rayon and yellow stripes of PPDT.

Table II mentions several properties for the cord composites III and IV according to the invention, which have a somewhat lower twist than the cord composites I and II of Table I.

The cord composite III is a cord of the construction:

(dtex 1840/f 1000 rayon+dtex 840/f 500 PPDT)Z 225×3 S225

The cord composite IV is a cord of the construction:

(dtex 1840/f 1000 rayon+dtex 840/f 500 PPDT)Z 250×3 S250.

TABLE II

|  | Cord composite III | | | Cord composite IV | | |
|---|---|---|---|---|---|---|
|  | greige undipped | dipped at 6,5 mN/tex | dipped at 13 mN/tex | greige undipped | dipped at 6,5 mN/tex | dipped at 13 mN/tex |
| AD linear density dtex | 9020 | 9380 | 9290 | 9270 | 9640 | 9550 |
| Diameter mm | 1,01 | 1,02 | 0,98 | 1,03 | 1,02 | 1,00 |
| Twist factor |  | 18000 |  |  | 20000 |  |
| BD strength N | 556 | 573 | 585 | 542 | 537 | 558 |
| BD tenacity mN/tex | 617 | 611[1] | 630[1] | 585 | 557[1] | 584[1] |
| BD tenacity N mm$^2$ | 694 | 701 | 776 | 651 | 657 | 711 |
| BD elong. at rupture % | 6,74 | 7,58 | 6,45 | 7,63 | 8,00 | 6,91 |
| BD 3%-LASE value N | 223 | 186 | 242 | 188 | 167 | 216 |
| BD 5%-LASE value N | 386 | 337 | 433 | 322 | 301 | 383 |

[1]Not corrected for dip absorption

The stress-strain curves for the cord composites III and IV were similar to those for the cord composites I and II and also corresponded to the stress-strain curve for homogeneous cords. For the tenacities the following efficiency values were found of the cored composites III and IV dipped and aftertreated at a tension of 13 mN/tex:

$$\text{Efficiency of cord composite III:} \frac{630}{\frac{2}{3} \times 440 + \frac{1}{3} \times 1250} = 89\%$$

$$\text{Efficiency of cord composite IV:} \frac{584}{\frac{2}{3} \times 415 + \frac{1}{3} \times 1150} = 89\%$$

Moreover, a few cord composites according to the invention were subjected to a strap peel adhesion test for determining the adhesion-to-rubber values. The adhesion values were compared with those of a homogeneous rayon cord having a similar thickness, viz. 0.95 mm. For the rubber in this test a commonly employed compound was taken.

TABLE III

| | dip tension in ments) | Adhesion (N) (average of 3 measurements) | Average difference between highest and lowest adhesion (N) (average of 3 measurements) | Rubber coverage (%) |
|---|---|---|---|---|
| Cord composite dtex 1840/f 1000 rayon + dtex. 840 f 500 PPDT | | | | |
| Z 225 × 3 S225 | 6,5 | 199 | 38 | 90 |
| Z 225 × 3 S250 | 13 | 200 | 35 | 80 |
| Z 250 × 3 S250 | 6,5 | 196 | 43 | 90 |
| Z 250 × 3 S250 | 13 | 196 | 36 | 80 |
| Z 310 × 3 S310 | 6,5 | 186 | 29 | 90 |
| Homogeneous rayon cord dtex 2400/f 1000 | | | | |
| Z 335 × 3 S335 | 13 | 195 | 23 | 100 |

Table III shows that surprisingly the adhesion level of the cord composites according to the invention does not appreciably differ from that of a homogeneous rayon cord. The degrees of rubber coverage of the chosen cord composites are somewhat lower.

Table IV lists a number of properties for some more cord composites V and VI according to the invention.

Cord composite V is a cord of the following construction:

(decitex 1840/f 1000 rayon+decitex 840/f 500 PPDT)Z 225×3 S225.

Cord composite VI is a cord of the construction:

(decitex 2440/f1000 rayon and decitex 1680/f1000 PPDT)Z 225×2 S225.

Cord composite VI is a cord of the construction:

(decitex 2440/f1000 rayon and decitex 1680/f1000 PPDT)Z 225×2 S225.

TABLE IV

|  | Cord composite V | | Cord composite VI | |
|---|---|---|---|---|
|  | greige undipped | dipped at 13 mN/tex | greige undipped | dipped at 13 mN/tex |
| AD linear density | 9000 | 9200 | 9100 | 9450 |
| Diameter mm | 1,01 | 0,98 | 1,06 | 1,03 |
| Twist factor |  | 18000 |  | 18000 |
| BD strength N | 610 | 630 | 656 | 690 |
| BD tenacity mN/tex | 680 | 680[1] 700[2] | 720 | 720[1] 750[2] |
| BD tenacity N mm$^2$ | 760 | 840 | 740 | 820 |
| BD elongation at rupture % | 7,4 | 6,8 | 7,1 | 6,3 |
| BD 1%-LASE value N | — | 73 | — | 85 |

[1]Not corrected for dip absorption
[2]Corrected for dip absorption

For the tenacities the following values were found of the dipped cord composites V and VI:

$$\text{Efficiency of cord V:} \frac{680}{\frac{2}{3} \times 440 + \frac{1}{3} \times 1250} = 96\%$$

$$\text{Efficiency of cord VI:} \frac{720}{\frac{6}{10} \times 440 + \frac{4}{10} \times 1250} = 94\%$$

To obtain some impression of the dimensional stability of the cord composite according to the invention as compared with that of other reinforcing materials an investigation has been made into the growth and creep properties of cords in the dipped state. By growth of a cord is to be understood here the percentage increase in length of a cord as a function of the load, i.e. 20 or 30% of the tenacity, and the time. The cords measured had been dipped in the usual manner, the cord composite having been dipped at a tension of 12 mN/tex. The cords were loaded on a Instron TTDM tensile tester at 20° C. and 65% relative humidity, use being made of a test (between clamps) of 50 cm and a standard pre-tension of 5 mN/tex. By the creep of the cord is to be understood the precentage increase in length over the period between 30 seconds and 24 hours.

Of the following cords the growth and the creep were measured:

|  | Tenacity (N) |
|---|---|
| Cord A: decitex 2440/f 1000 rayon Z335 × 2 S335 | 260 (AD) |
| Cord B: decitex 1440/f 192 polyester Z415 × 2 S415 | 200 |
| Cord C: decitex 1680/f 1000 PPDT Z330 × 2 S330 | 445 |
| Cord composite D according to the invention: decitex 1840/f 1000 rayon + decitex 840/500 PPDT) Z225 × 3 S225 | 540 (AD) |
| Cord E: decitex 1650/f 1000 PPDT Z330 × 2 S330 | 450 |

The cords A, B and C were made by Applicant. Cord E is a commercially available cord not made by Applicant. The measuring results for the growth and the creep of the cords A through E are mentioned in Table V.

TABLE V

|  | percentage of the tenacity | % increase in length | | | | | creep between 30 seconds and 24 hours |
|---|---|---|---|---|---|---|---|
|  |  | growth | | | | |  |
|  |  | immediately | after 30 seconds | after 1 hour | after 4 hours | after 24 hours |  |
| Cord A | 20 | 1,85 | 2,43 | 4,18 | 4,63 | 5,01 | 2,58 |
| (rayon) | 30 | 1,66 | 2,49 | 8,36 | 8,74 | 9,05 | — |
| Cord B | 20 | 2,87 | 3,18 | 3,68 | 3,79 | 3,88 | 0,70 |
| (polyester) | 30 | 4,49 | 4,82 | 5,40 | 5,57 | 5,71 | 0,89 |
| Cord C | 20 | 1,39 | 1,47 | 1,61 | 1,63 | 1,67 | 0,20 |
| (PPDT) | 30 | 1,90 | 2,00 | 2,18 | 2,21 | 2,26 | 0,26 |
| Cord D | 20 | 2,01 | 2,29 | 2,82 | 2,94 | 3,06 | 0,77 |
| (cord comp.) | 30 | 2,86 | 3,11 | 3,66 | 3,78 | 3,91 | 0,80 |
| Cord E | 20 | 1,50 | 1,59 | 1,78 | 1,82 | 1,87 | 0,28 |
| (PPDT) | 30 | 2,27 | 2,39 | 2,62 | 2,66 | 2,72 | 0,33 |

From the growth and the creep figures in Table V it appears that the dimensional stability of the cord composite D according to the invention is considerably better than that of a fully rayon cord and even better than the of a fully polyester cord.

Since the cord composite according to the invention is particularly intended for use as a reinforcement in vehicle tires in which the cord is subject to a frequently varying load, the cord composite according to the invention was also tested for fatigue resistance and the results obtained were compared with those for 100%-rayon and 100%-PPDT cords. The fatigue resistance may be measured by various methods known in the art. Two of these methods, which were used in the present case, are the Goodyear Tube Fatigue test (GTF) and the Goodyear Block Fatigue test (GBF).

In accordance with the GTF test the tire cord is embedded lengthwise in a tubular piece of rubber of standardized dimensions, followed by twisting the tube in a standardized manner while keeping it under internal pressure and in a bent state. The time or the number of loading cycles up to the moment the tube bursts open or at least the internal pressure decreases is considered a measure of the fatigue resistance.

The cord composite according to the invention shows a somewhat better behaviour in the GFT test than the 100%-rayon cord.

The twist factors of the cord composite and the 100%-rayon cord were, of course, approximately the same.

The invention will be further described with reference to the accompanying schematic drawing.

Figures 1, 2:
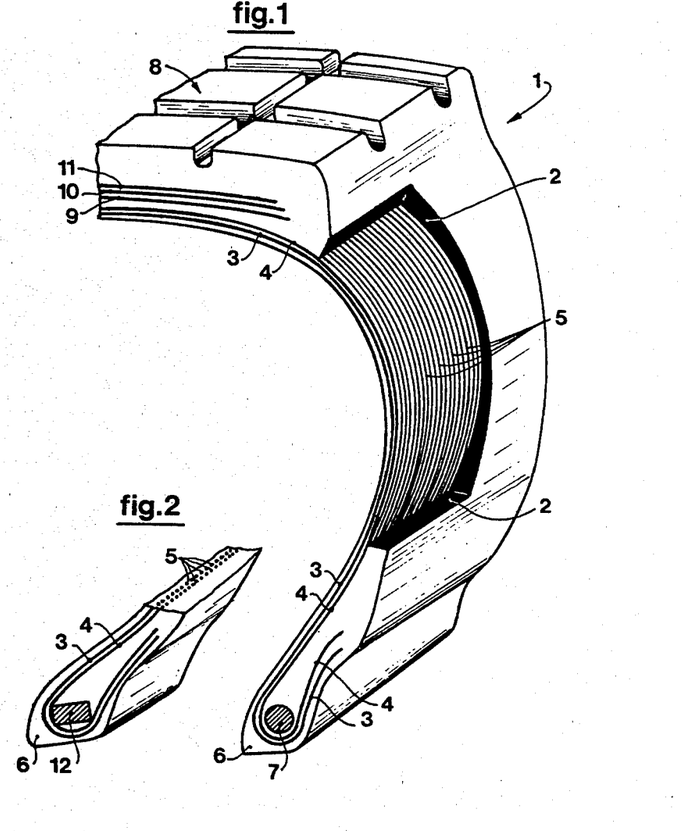
FIG. 1 a detailed view of a vehicle tire partly in elevation and partly in perspective.
FIG. 2 shows a small detail of a tubeless vehicle tire.

FIG. 1 shows part of a pneumatic radial ply tire for a truck. The tire, which is generally referred to by the numeral 1, consists of a mass of rubber 2 which in the first place is reinforced with a carcass consisting of two fabric plies 3 and 4. In each fabric ply the warp consists of composite cords according to the invention. The carcass fabrics are so positioned in the tire that the reinforcing elements in the form of cord composites 5 lie in a radial plane of the tire 1. Further, the carcass fabrics extend throughout the tire from the one bead 6 of the tire to the other bead not shown in the drawing. In either bead the carcass fabrics 3, 4 are passed around the steel bead wire 7. Underneath the tread 8 the tyre may still be reinforced with, for instance, three belt strips 9, 10 and 11 of the usual construction.

Figure 3:
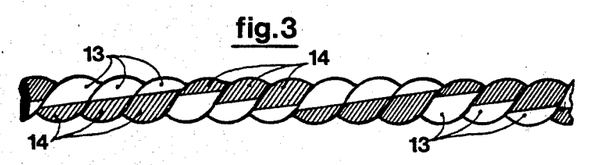
FIG. 3 is an elevational view of the above-described cord composite III.
Figure 4:
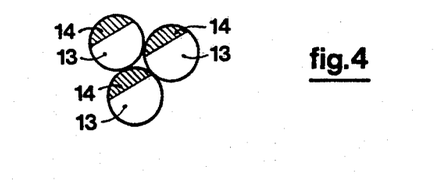
FIG. 4 is a cross-sectional view of the cord composite II.

FIG. 2 shows a detail of a tubeless tire. Like parts are referred to by the same numerals. The most important difference between the tires according to the FIGS. 1 and 2 consists in the somewhat variant form of the bead wire 12. FIG. 3 is an elevational view of the above-described cord composite II, whereas FIG. 4 shows the same cord in cross-section. The viscose rayon filament bundles 13 are indicated by blank spaces and the PPDT filament bundles by hatched circles. As also can be seen in FIG. 4, the cord composite II is made up of three groups. Each group is formed by an untwisted filament bundle 13 of viscose rayon and an untwisted filament bundle 14 of PPDT.

Figure 5:
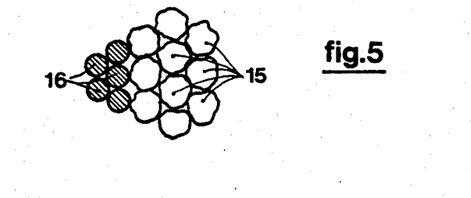
FIG. 5 is a cross-sectional view on an enlarged scale of a small part of the cord composite II.

FIG. 5 is a very much enlarged view of a small part of the cord composite II according to FIGS. 3 and 4. Of the rayon filament bundles in FIG. 5 ten filaments 15 are drawn and of the filament bundles of PPDT five hatched filaments 16 are drawn. In reality the filaments 16 of PPDT have a virtually circular cross-section. In reality the filaments 15 of rayon have a somewhat erratically shaped cross-section, as is roughly indicated in the drawing.

Figure 6:
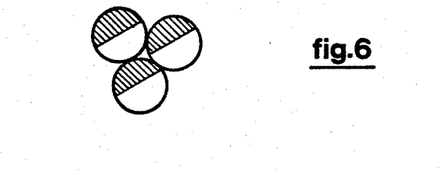
FIGS. 6, 7, 8 and 9 are cross-sectional views of somewhat variant cord composites according to the invention.

FIG. 6 shows a cord composite according to the invention having the construction:

(dtex 1840/f 1000 rayon+dtex 1680/f 1000 PPDT)Zn×3Sn.

Figure 7:
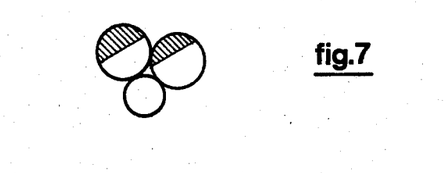

FIG. 7 shows a cord composite according to the invention having the construction:

[(dtex 1840/f 1000 rayon+dtex 1680/f 1000 PPDT)Zn×2+dtex 1840/f 1000 rayon Zn]Sn.

Figure 8:
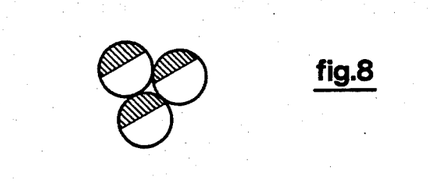

FIG. 8 shows an asymmetrical cord composite according to the invention having the construction:

(dtex 1840/f 1000 rayon+dtex 1680/f 1000 PPDT)Zn×3Sl.

Figure 9:
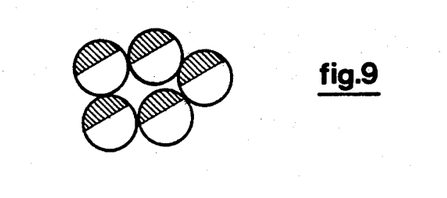

FIG. 9 shows a cord composite according to the invention having the construction:

(dtex 1840/f 1000 rayon+dtex 1680/f 1000 PPDT)Zn×5Sn.

Also in FIGS. 6-9 the PPDT portion is hatched and the rayon material is indicated by blank spaces.

The afore-mentioned inherent viscosity $\eta_{inh}$ of the poly-paraphenylene terephthalamide is defined by the equation:

$$\eta_{inh} = \frac{\ln \eta_{rel}}{0,5}$$

where $\eta_{rel}$ is the ratio of the efflux time of a solution of the PPDT (0.5 g PPDT in 100 ml of 96% by weight-sulphuric acid) to that of the pure solvent measured in a capillary viscometer at 25° C.

The afore-mentioned Tappi viscosity for viscose rayon was determined in accordance with SAI CA 1.2.20–52/6, based on the Tappi-method T206 m-44.

The tenacity, the elongation at rupture, the LASE values and the initial modulus of single filaments, a filament bundle, a dipped or non-dipped cord are determined in conformity with the bonedry (BD) method (ASTM D885) by means of an Instron tensile tester (Instron Engineering Corp., Canton, Massachusetts, USA). The 1.3 and 5%-LASE values give the loads at an elongation of 1.3 and 5%, respectively. The yarns were pre-twisted to a twist-factor of about 2800 for PPDT and 3500 for rayon. Instead of the temperature of 24° C. and the relative humidity of 55% mentioned in ASTM D885 the values used in the tests were 20° C. and 65% relative humidity, respectively. The tensile tests were conducted in fivefold on specimens having a test length (between clamps) of 500 mm. For PPDT a tensile rate of 50 mm/minute and a pre-tension of 20 mN/tex were applied. For viscose rayon a tensile rate of 500 mm/minute and a pre-tension of 5 mN/tex were used. The tenacities and the specific LASE values were determined by dividing the tenacity and the LASE value by the linear density. To the cord composites according to the invention there were applied a tensile rate of 500 mm/min and a pre-tension of 20 mN/tex, unless otherwise indicated.

The linear density of a filament specimen is determined by weighing a particular length of filament (100 cm), which length is measured at a tension of 0.1 cN/dtex.

By the twist factor T is meant the value $$T = n\sqrt{\frac{\text{linear density}}{\text{specific mass}}}$$

where n is the cord twist in turns per meter and the linear density is expressed in decitex. For the cord composite the specific mass is to be calculated on the basis of the specific mass in g/cm³ of the PPDT and the viscose rayon material used.

By degree of rubber coverage is meant the proportion of cord covered with rubber after pulling the strap. The amount of rubber on the cord is determined visually and expressed in a percentage. The adhesion is determined mainly in accordance with the strap peel test described in ASTM D2630.

With regard to the term reinforcing cord for elastomeric objects it should be added that by elastomers are to be understood synthetic and natural polymers displaying a rubber-elastic behaviour, such as synthetic and natural rubber and thermoplastic elastomers. As examples of such polymers may be mentioned polybutadiene, polyisoprene, poly(butadiene-styrene), poly(butadiene-acrylonitrile), poly(ethylene-propylene), poly(isobutylene-isoprene), polychloroprene, polyacrylate, polysulphide, silicones, polyurethanes, plasticized polyvinyl chloride, polyesters, etc. To the elastomeric material there may still be added various compounding ingredients and other substances known in themselves, such as vulcanizing agents, for instance: carbon black, sulphur, zinc oxide and accelerators. Reference is still made to U.S. Pat. No. 3,977,172 describing a reinforcing cord for rubber objects, which cord comprises one or two PPDT filament bundles and one nylon or polyester filament bundle. In that cord the filament bundles consisting of the different materials must have previously been twisted in the same direction and they must have the same linear density. Further, this known cord must be provided with an adhesive by some two-bath dip system, which leads to additional cost compared with the one-bath system. Surprisingly, in the composite cord according to the invention the rayon and the PPDT filament bundles need not be twisted and need not have the same dimensions.

Within the scope of the invention various modifications may be introduced. Although the cord composite according to the invention is destined in the first place for use as reinforcing material for vehicle tires, it may also be advantageously used as reinforcing material in hosing.

What is claimed is:

1. A reinforcing cord for elastomeric articles, which cord is built up from at least two endless filament bundles which are twisted or laid together and comprising two different materials, in which the cord is built up of at least two groups which each contain at least two filament bundles and that in each group at least one filament bundle is of poly-paraphenylene terephthalamide and at least one filament bundle is of viscose rayon, the filament bundles of poly-paraphenylene terephthalamide having the following characteristics:

an inherent viscosity of at least 2.5, and preferably at least 3.5 and less than 7;
a tenacity of at least 10 cN/dtex, and preferably at least 17 cN/dtex and less than 40 cN/dtex;
an elongation at rupture of at least 2.7%, by preference at least 3.4% and less than 6%;
a specific 1%-LASE value of at least 2.8 cN/dtex, and preferably at least 3.5 cN/dtex and less than 15 cN/dtex; and the filament bundles of viscose rayon having the following characteristics;
a tenacity of at least 3 cN/dtex, and preferably about 5 cN/dtex and less than 12 cN/dtex;
an elongation at rupture of at least 8%, and preferably about 13% and less than 25%;
a specific 5%-LASE value of at least 1.5 cN/dtex, and preferably about 2.5 cN/dtex and less than 20 cN/dtex.

2. A reinforcing cord according to claim 1, in which in each group the separate filament bundles of different materials having practically no twist.

3. A reinforcing cord according to claim 1, in which the ratio $$R = \frac{D_{rayon}}{D_{PPDT}}$$

is in the range of 0.2 to 4.0, and preferably $$\frac{R}{D} = 1-1.5,$$

where $$D_{PPDT} = \frac{4 \cdot Ap}{\pi},$$

wherein Ap is the average cross-sectional area of the PPDT filaments, and where $$D_{rayon} = \frac{4 \cdot Ar}{\pi},$$

wherein Ar is the average cross-sectional area of the rayon filaments.

4. A reinforcing cord according to claim 1, in which in each group the ratio $$\frac{R}{T} = \frac{T_{rayon}}{T_{PPDT}}$$

is in the range of 10 to 0.1, but by preference $\frac{R}{T}$ is approximately 1–2, where $T_{PPDT}$ is the linear density in decitex of the filament bundle(s) of poly-paraphenylene terephthalamide and $T_{rayon}$ is the linear density in decitex of the filament bundle(s) of viscose rayon.

5. A reinforcing cord according to claim 1, in which each of said groups is formed by one filament bundle of poly-paraphenylene terephthalamide and one filament bundle of viscose rayon.

6. A reinforcing cord according to claim 5, in which of the poly-paraphenylene terephthalamide filament bundle the total linear density is in the range of 350 to 3500 decitex, and preferably in the range of about 850 to 1700 decitex, and the number of filaments of said PPDT bundle is in the range of 200 to 2400, and preferably in the range of about 500 to 1000.

7. A reinforcing cord according to claim 5 or 6, in which of the rayon filament bundle the total linear density is in the range of 1000 to 3000 decitex, and the number of filaments in said rayon bundle is in the range of about 500 to 2000.

8. A reinforcing cord according to claim 1, in which the cord is built up from groups of filament bundles, of which each group has an initial twist of 100 to 400 turns per meter, and preferably about 200 to 300 turns per meter, and in that at least two of said groups of filament bundles are twisted together in opposite direction to a cord twist of 100 to 400 turns per meter, and preferably 200 to 300 turns per meter.

9. The reinforcing cord according to claim 1, in which the twist factor T of the cord is in the range of 10000 to 25000, and is preferably in the order of 18000.

10. A reinforcing cord according to claim 1, in which the cord is provided with a binder, an adhesive and/or a protecting agent for the rubber.

11. A reinforcing cord according to claim 10, in which the binder and at least one of the adhesive and the protective agent is substantially formed by resins based on resorcinol-formaldehyde latex.

12. A reinforcing cord according to claim 10, in which the binder and at least one of the adhesive and protective agent is substantially formed by resins based on polyurethane latex.

13. A shaped article of elastomeric material, in which the elastomeric material is reinforced with cords according to claim 1.

14. A pneumatic tire for a vehicle, in which the reinforcing material for the tire is at least partly formed by the reinforcing cords according to claim 1.

15. A pneumatic tire, in which the carcass is at least partly formed by the reinforcing cords according to claim 1.

16. A pneumatic tire, more particularly for trucks, in which the carcass is substantially made up of reinforcing cords according to claim 1 and the carcass consists of two plies.

17. A pneumatic tire, more particularly for a passenger car, in which the carcass is substantially made up of reinforcing cords according to claim 1 and the carcass consists of one ply.

18. A pneumatic tire according to claim 14, in which the tire is in the form of a radial ply tire.

19. A process for the manufacture of a reinforcing cord for elastomeric articles having at least two endless filament bundles which are twisted or laid together and comprising two different materials, in which the cord is built up of at least two groups which each contain at least two filament bundles and that in each group at least one filament bundle is of poly-paraphenylene terephthalamide and at least one filament bundle is of viscose rayon, said process comprising forming at least two groups of filament bundles, each group comprising at least two filament bundles and in each group at least one filament bundle being formed from poly-paraphenylene terephthalamide and at least one filament bundle being formed from viscose rayon; twisting the filament bundles of poly-paraphenylene terephthalamide and rayon to a twist of not more than 50 t/m, and preferably have hardly any twist; and twisting each group of filaments in a given group with an initial twist in one direction and twisting together at least two groups of filament bundles with an initial twist to form a cord having a cord twist in the opposite direction.

20. A process according to claim 19, in which a group initial twist and a cord twist are of virtually the same magnitude.

21. A process according to claim 19, in which a binder and/or an adhesive are applied to the cord, including passing the cord through a bath containing an emulsion based on resorcinol-formaldehyde latex and/or polyurethane latex and aftertreating the cord under tension at elevated temperature.

22. A process according to claim 21, including passing the cord only once through the bath containing the adhesive and aftertreating over a preriod of 50 to 300 seconds, preferably 120 seconds, at a temperature in the range of 120° to 220° C., preferably 150°-175° C., and at a tension of at least 5 mN/tex and not higher than 100 mN/tex, and preferably 10 to 20 mN/tex.

23. A process for the manufacture of a pneumatic vehicle tire, in which the reinforcing material for the tire is the cord according to claim 1.

24. A process for the manufacture of a pneumatic tire of the type usually employed for trucks, more particularly a radial-ply tire, in which the tire has a carcass consisting of two plies substantially containing reinforcing cords according to claim 1.

25. A process for the manufacture of a pneumatic tire of the type usually employed for passenger cars, more particularly a radial-ply tire, in which the tire has a carcass consisting of one ply substantially containing reinforcing cords according to claim 1.

* * * * *